No. 697,624. Patented Apr. 15, 1902.
H. E. HICKOX.
PHOTOGRAPHIC CAMERA.
(Application filed Oct. 14, 1901.)
(No Model.) 2 Sheets—Sheet 1.
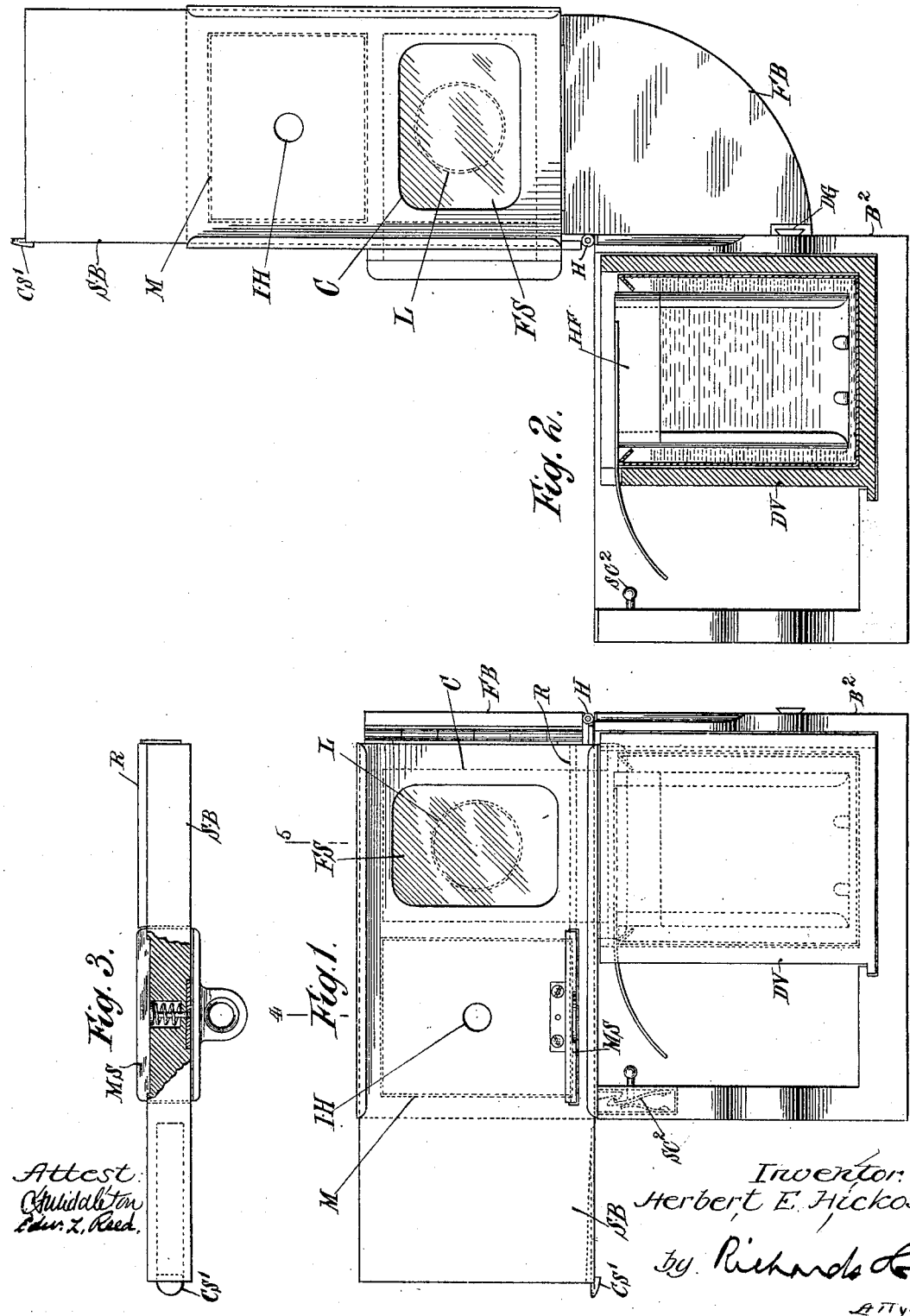
Inventor:
Herbert E. Hickox
by Richards
Attys No. 697,624. Patented Apr. 15, 1902.
H. E. HICKOX.
PHOTOGRAPHIC CAMERA.
(Application filed Oct. 14, 1901.)
(No Model.) 2 Sheets—Sheet 2.
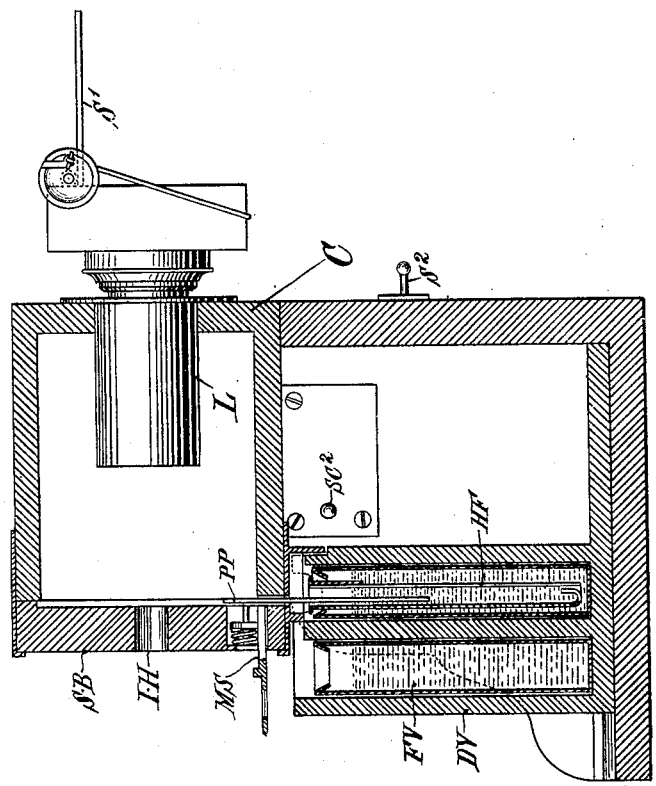
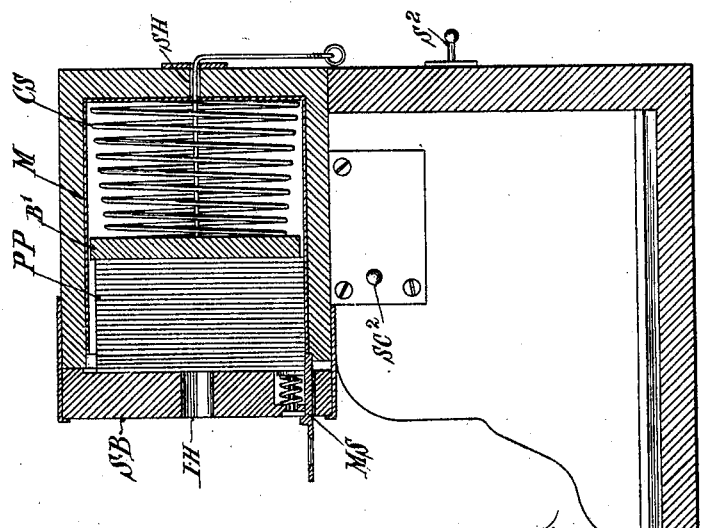
Inventor
Herbert E. Hickox,
by Richards & Co
attys
Attest:
D. Middleton
Edw. L. Reed.

UNITED STATES PATENT OFFICE.

HERBERT EDWARD HICKOX, OF GREAT YARMOUTH, ENGLAND.

PHOTOGRAPHIC CAMERA.

SPECIFICATION forming part of Letters Patent No. 697,624, dated April 15, 1902.

Application filed October 14, 1901. Serial No. 78,626. (No model.)

*To all whom it may concern:*

Be it known that I, HERBERT EDWARD HICKOX, of No. 13 Row 136, South Quay, Great Yarmouth, in the county of Norfolk, England, have invented certain new and useful Improvements in Photographic Cameras; and I do hereby declare the following to be a full, clear, and exact description of the invention, such as will enable others skilled in the art to which it appertains to make and use the same.

This invention has reference to an improved form of construction of a magazine-camera which is specially suitable for use with positive ferrotype-plates, the development and fixing of which are provided for within the camera itself and can be performed immediately after the photograph has been taken.

According to my invention the camera is constructed in three compartments — the camera proper, which is provided with a shutter-closed aperture in front of a lens, which lens is made adjustable in position for focusing purposes, a magazine-compartment which contains the plates held in reverse for use, and a compartment wherein the operations of developing and fixing are performed. The two former compartments are constructed in one piece divided by a light-tight partition, and this is hinged at one side to the portion of the camera which contains the third compartment, so that it may be turned through a right angle relatively to it. The second portion serves as the base of the camera and is provided with means of attachment to a camera-stand. The two first-mentioned compartments have a back end piece common to the two, the length of which is equal to the width of about three such compartments and which is constructed to slide light-tight transversely in a direction from one compartment to the other. In one end third of the length of this slide a semitransparent focusing-screen is provided, which is preferably opaque to actinic rays. In the middle third of the length a recess is formed of just the size and depth to receive a plate and its carrier, the third portion of the length of the slide being quite plain. When the slide is in its extreme position one way, the focusing-screen is at the back of the camera proper, and by opening the shutter the operator is then able to look through and adjust the lens to focus the subject to be photographed, after which the shutter is automatically closed. At this time also the recess in the center of the slide is at the back end of the magazine, and by the elastic force of a coiled spring, which is inserted between the stock of reserve plates and the other end of the magazine, one carrier and the plate which it contains are thrust into the recess. If now the slide is moved a distance equal to the width of one compartment, the plate in the recess will be conveyed into the position previously occupied by the focusing-screen, and on raising the shutter the photograph will be taken. At this time the magazine is closed by the plain end portion of the slide. In the bottom of the recess in the slide a movable shelf is provided, which is held in place by a spring. This shelf sustains the plate and carrier in the recess until it is withdrawn in opposition to the force of the spring, when the plate, with its carrier, is allowed to drop vertically into a holding-frame fitted with a lifting-handle contained in a vessel underneath the shelf, which is supplied with developing solution. After a sufficient length of time the developing vessel is withdrawn from being underneath the slide, and the holder containing the carrier and plate is lifted and immersed in a fixing solution, which is contained in an adjacent vessel. When the process of fixing is completed, the photograph only requires washing to be finished. The whole operation may be repeated as many times as there are plates in the magazine. All the movements requisite are to replace the developing-bath, to move the slide into position to receive a fresh plate from the magazine, to transfer the plate to the camera proper by a reverse movement of the slide, and, after opening the shutter, to withdraw the shelf and drop the plate into the developer, from which, after a lapse of time, it is transferred to the fixing-bath. The plates used are oblong, and for some pictures the long side is required to be vertical, while for others it should be horizontal. In the normal position of the portion containing the camera proper, which is hinged to the lower portion or base, it is in general arranged that the long side of the plates shall be vertical; but by turning the hinged portion through a right angle relatively to the base a photograph can be taken with the long side horizontal. A hinged bracket and dovetailed groove are provided to rigidly secure the hinged portion in that position and a spring-catch to secure it when in the normal position. After having taken a photograph with the long side vertical the hinged portion of the camera must be turned down into the normal position, and then on withdrawing the shelf the plate will drop into the developing-bath, which will then be underneath it.

When it is desired that the exposed plates should not be developed and fixed at once, the vessels containing the solutions may be replaced by a light-tight box into which the plates may be dropped from the shelf, to be afterward developed and fixed at leisure.

In order that the construction of my improved camera may be clearly understood in all its details, I will now refer to the annexed drawings, which form a portion of my specification.

On Sheet 1, Figure 1 shows a rear view of the camera with the upper compartments in the normal position, suitable for taking a photograph with the long side of the plate in the vertical position, the slide being in the situation for focusing. Fig. 2 shows a rear view with the upper compartments turned through a right angle into a position suitable for taking a photograph with the long side of the plate horizontal. In this figure the developing vessel is shown in section. Fig. 3 is a plan of the slide detached from the camera, a portion being in section to show the construction of the movable shelf and spring. On Sheet 2, Fig. 4 shows a section of the magazine-compartment, taken through the line 4 4 of Fig. 1; and Fig. 5 is a section of the camera proper, taken through the line 5 5 of Fig. 1, but with the slide shifted into a position for exposing a plate, and for allowing it to drop into the developing-bath the shelf is shown withdrawn and the plate in the act of falling.

In the views, C is the camera-compartment, with lens L and shutter S', F S being the focusing-screen.

M S is the movable shelf retained in position for sustaining a plate by a spring shown in Fig. 3, the shelf being shown withdrawn in Fig. 5.

I H is an inspection-hole through the slide, which enables the operator to be sure that he has a plate in position for taking a photograph and that the plate has dropped into the developing vessel on the withdrawal of the shelf.

M is the magazine.

P P are photographic plates in reserve, which are pressed toward the sliding back S B by means of the coiled spring C S, a block B' being interposed, which is thicker than a plate. When the plates are exhausted, the block partially enters the recess, which is only deep enough to receive one plate at a time, and then the slide will be prevented from being shifted into the photographing position. The operator will in this way be informed that all the plates are exhausted and require renewal. To refill the magazine, the slide must be removed or slid a greater distance to the right. To allow this to be done, the block B' must be pushed back against the compressive force of the spring by means of a pencil or other instrument inserted through the inspection-hole I H, also a spring-catch S C' must be lifted. To facilitate the recharging of the magazine, the end of the coiled spring may be drawn back by a string which passes through the string-hole S H and be secured by a ring to a stud $S^2$. A spring-catch S C' is provided to prevent the sliding back S B from being pushed beyond the proper position for taking a photograph unless the catch is lifted.

R is a rib on the slide in line with the movable shelf. It occupies the groove which is required for the movable shelf in the absence of the shelf and so prevents the penetration of light.

D V is the developing vessel containing a holding-frame H F, into which the photographic plate drops when the movable shelf M S is drawn back. When the development is completed, the box containing the vessel D V can be drawn sufficiently into the open to permit the holder containing the plate to be lifted out of the developer and immersed in the fixing solution which is contained in the vessel F V.

When it is desired to take a photograph with the long side of the plate horizontal, the spring-catch S $C^2$ is pressed, releasing the piece containing the two compartments C and M, which is turned around the hinge H into the position shown in Fig. 2, the folding bracket F B, which ordinarily lies folded back in a recess above the hinge, (see Fig. 1,) being turned about its own hinge, so that the dovetailed groove D G, which is formed in it, is caused to fit over a corresponding projection which is secured to the lower portion or base $B^2$ of the camera. After the photograph has been taken in this position the bracket is pressed off the dovetailed projection and the portion carrying the plates is restored to the position shown in Fig. 1. The shelf M S may now be withdrawn and the exposed plate dropped into the developing vessel D V.

If an ordinary light-tight box is substituted for the box which carries the developing and fixing vessels, the plates can be dropped into it to await development and fixing in the ordinary way in a dark room.

I claim—

1. A photographic camera consisting of three compartments, two of which are made in one piece and have a common sliding back provided with a shallow recess for holding a plate, a focusing-screen and a movable shelf to drop the exposed plate out of the camera, one of these two compartments being fitted to contain a number of reserve plates which are spring-pressed against the sliding back, the other compartment being provided with an adjustable lens and hinged shutter, and a third compartment provided with two vessels one containing a developing solution and the other a fixing solution the former vessel lying close under the movable shelf in the position occupied when a plate is exposed, substantially as described and shown.

2. A photographic camera consisting of three compartments two of which are made in one piece with a common sliding back fitted with a movable shelf, one of these two compartments being a magazine of reserve plates and the other a camera proper, these two compartments being hinged to the third compartment so that the two compartments may be turned through a right angle relatively to the third and rigidly secured in that position by a folding bracket, and in the other position be so situated that the movable shelf, when withdrawn, will permit a plate, in the compartment forming the camera proper, to drop into the third compartment which will then be light-tight substantially as described and shown.

In witness whereof I have hereunto set my hand in the presence of two witnesses.

HERBERT EDWARD HICKOX.

Witnesses:
ROBT. A. BLAKE,
WALTER J. SKERTEN.